US007575155B2

(12) United States Patent
Tennant

(10) Patent No.: US 7,575,155 B2
(45) Date of Patent: Aug. 18, 2009

(54) ROTATING PATH SWITCH

(75) Inventor: Alan Tennant, Kinross (GB)

(73) Assignee: NCR Corporation, Dayton, OH (US)

( * ) Notice: Subject to any disclaimer, the term of this patent is extended or adjusted under 35 U.S.C. 154(b) by 611 days.

(21) Appl. No.: 11/305,756

(22) Filed: Dec. 16, 2005

(65) Prior Publication Data

US 2007/0138264 A1 Jun. 21, 2007

(51) Int. Cl.
*G06Q 40/00* (2006.01)
*G07D 11/00* (2006.01)
*G07F 19/00* (2006.01)

(52) U.S. Cl. ....................................... 235/379; 235/375

(58) Field of Classification Search ................. 235/379, 235/375; 902/8-15; 705/43
See application file for complete search history.

(56) References Cited

U.S. PATENT DOCUMENTS 6,196,457 B1 * 3/2001 Patterson .................... 235/379
2006/0163027 A1 * 7/2006 Hobmeier et al. ........... 194/207

* cited by examiner

*Primary Examiner*—Edwyn Labaze

(57) ABSTRACT

The invention provides a track arrangement for guiding a media carrier in a self-service terminal between a home position and one of a second and a third position. The track arrangement comprises: a first track length defining the home position of the media carrier; a second track length associated with the second position; a third track length associated with the third position; and a switch arranged to be rotatable around a central axis adjacent the convergence of the three track lengths, the switch having a portion of track extending across the switch. The second track length is positioned such that the angle between the second track length at an end adjacent to the switch, and the home position of the media carrier, is greater than 90°. The second track length is positioned such that the angle between the third track length at an end adjacent to the switch and the home position of the media carrier is greater than 90°.

15 Claims, 7 Drawing Sheets

ROTATING PATH SWITCH

The present invention relates to a rotating path switch. It is particularly related to, but in no way limited to, a shuttle path switch for use in a self-service terminal (SST) or an automated teller machine (ATM).

BACKGROUND

FIG. 1 shows a schematic side elevation view of a cash dispenser unit 73 of an ATM. The cash dispenser unit 73 holds a number of currency cassettes 89 each holding a stack of currency notes 68. Each cassette 89 holds only one denomination of currency notes, but different cassettes may contain different denominations. The notes 68 are held in place in the cassette by means of a pusher plate 69 that urges the stack of notes to one end of the cassette. When one or more notes are to be dispensed from a particular cassette, the pick mechanism 74 associated with the cassette draws a note from the cassette such that its leading edge is gripped between drive rollers 90. The note is then fed along the feed path 72 by further drive rollers 92, through a retard mechanism 10 to the stacker wheel assembly 75. In operation, the stacker wheel assembly 75 rotates continuously in a counter-clockwise direction (for the arrangement shown in FIG. 1) and the note is fed into a compartment 81 formed between adjacent tines 78. If more than one note is to be dispensed, each note is fed into a successive compartment 81 as the stacker wheel assembly 75 rotates. Having completed half a rotation, the note is removed from the stacker wheel assembly 75 by fingers 94 of a stripper plate assembly 96 pivotally mounted on a shaft 98. Once removed from the stacker wheel, the note is placed on a belt 100 resting against the stripper plate assembly 96 and any subsequent notes which are to be dispensed simultaneously with the first note are placed on top of the first note to form a bundle 68'. When the required amount of notes (which may be just one note) have been assembled into the bundle 68', a pair of belts 102 (only one of which is shown in FIG. 1) is rotated on a shaft 104 such that the bundle 68' is trapped between the belts 100, 102. The bundle is then fed between belts 100, 102, 106, 108 through a note exit slot 110 in the housing 1 12 of the cash dispenser unit 73 to a position where the bundle 68' can be collected by the user of the ATM. If a multiple feeding is detected in the course of stacking the bundle of notes 68' or one or more of the notes is rejected for any reason, the bundle is not fed to the note exit slot 110. Instead the stripper plate assembly 96 is pivoted into a position as shown by the dashed outline 96' and the belts 100, 102 are operated in the reverse direction to deposit the bundle 68' into a reject note container 114 via an opening 116.

In another example of a dispensing unit of an ATM, a shuttle traveling along a track (or path) can be used to receive the notes from the stacker wheel assembly 75 and to move the bundle 68' so that it can be fed through the note exit slot 110 or alternatively deposited into a reject note container 114 (also referred to as a purge bin). FIG. 2 shows a schematic diagram of a shuttle 200 having an opening 201 to receive notes from the stacker wheel assembly so that the bundle of notes 68' can be assembled within the shuttle. The shuttle is mounted on two parallel axles 202, 203 and on each side of the shuttle there are two wheels 204, 205. The wheels run in a path or track 303 and the motion of the shuttle 200 can be described with reference to FIGS. 3 and 4 (only wheels on one side of the shuttle and one track are shown in FIGS. 3 and 4). The shuttle receives notes in a home position 300. A mechanical turntable 304 is used to direct the shuttle from the home position along either a first path 305 to the note exit slot or a second path 306 to the purge bin. FIG. 3 shows the turntable 304 in a first position 307 in which the shuttle would be directed along a first length of track 309 on the turntable and on to the first path 305 to the note exit slot. FIG. 4 shows the turntable 304 in a second position 308 in which the shuttle would be directed along a second length of track 310 on the turntable and on to the second path 306 to the purge bin.

The note bundle handling mechanisms described above, i.e. the belt system of FIG. 1 and the shuttle system of FIGS. 2-4, both have a problem that they take up a large amount of space, which results in the overall dispenser 73 being very large.

The invention seeks to provide an improved rotating path switch that can be used to provide a compact note bundle handling mechanism.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect provides a track arrangement for guiding a media carrier in a self-service terminal between a home position and one of a second and a third position, the track arrangement comprising: a first track length defining the home position of the media carrier; a second track length associated with the second position; a third track length associated with the third position; and a switch arranged to be rotatable around a central axis adjacent the convergence of the three track lengths, the switch having a portion of track extending across the switch; wherein a first angle between the second track length at an end adjacent to the switch, and the home position of the media carrier, is greater than 90°; and wherein a second angle between the third track length at an end adjacent to the switch and the home position of the media carrier is greater than 90°.

Advantageously, this provides a compact track arrangement which can be used to provide a compact node bundle handling mechanism.

A further advantage of this arrangement of tracks is that it enables the media carrier to move smoothly between the home position and either the second or third positions without jamming.

Preferably the switch is rotatable between a first and a second position, wherein in the first position, the portion of track is aligned with the first and second lengths of track, and in the second position, the portion of track is aligned with the third length of track.

Advantageously, this enables the media carrier to move between the first length of track and either the second or third lengths of track.

Preferably the first angle is approximately 120° and the second angle is approximately 120°.

Preferably the home position of the media carrier is defined as extending between an end of the first track length distal from the switch and the central axis of the switch.

Advantageously, this provides a compact arrangement and minimizes the required length of the first track length.

Preferably the second position is a media dispensing position.

Preferably the third position is a media purging position.

Preferably the home position is a media receiving position.

A second aspect provides a dispenser for media comprising a track arrangement as described above and a media carrier.

Preferably the media carrier comprises a body, a guide wheel, a drive wheel and a motor connected to the drive wheel, and wherein the guide wheel and the drive wheel move along the track arrangement.

Preferably, in the home position of the media carrier the drive wheel is located in the first track length and the guide wheel is located at the central axis of the switch.

Preferably, in the second position of the media carrier, the drive wheel and the guide wheel are located in the second track length.

Preferably, in the third position of the media carrier, the drive wheel is located at the central axis of the switch.

Preferably the third track length comprises a movable portion, and wherein in the third position of the media carrier, the guide wheel is located on the movable portion and the movable portion has moved from a first position in line with the third track length and a second position below the third track length.

Preferably the dispenser further comprises a second track arrangement as described above and preferably the media carrier further comprises a second guide wheel and a second drive wheel, and the second guide wheel and the second drive wheel move along the second track arrangement.

A third aspect provides a method of moving media from a home position to a purge position within a self-service terminal, the self service terminal comprising: a media carrier including a drive wheel and a guide wheel; and a track arrangement comprising: a first track length defining the home position of the media carrier; a second track length associated with a dispensing position; a third track length associated with the purge position; and a switch arranged to be rotatable around a central axis adjacent the convergence of the three track lengths, the switch having a portion of track extending across the switch; wherein a first angle between the second track length at an end adjacent to the switch, and the home position of the media carrier, is greater than 90°; and wherein a second angle between the third track length at an end adjacent to the switch and the home position of the media carrier is greater than 90° and wherein the drive and guide wheels are guided by the track arrangement, the method comprising: receiving media in the media carrier at the home location, wherein in the home location the drive wheel is located in the first track length and the guide wheel is located at the central axis of the switch; moving the switch into a first position in which the portion of the track is aligned with the third length of track; moving the media carrier such that the guide wheel enters the third length of track; moving the switch to a second position in which the portion of track is aligned with the first length of track; and moving the media carrier along the third length of track until the drive wheel is located at the central axis of the switch.

Preferably the third track length comprises a moveable portion and wherein the method further comprises: moving the moveable portion through an arc; and moving the guide wheel with the moveable portion such that the guide wheel remains resting on the moveable portion.

A fourth aspect provides a track arrangement for guiding a media carrier substantially as described with reference to FIGS. 6-8 of the drawings.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
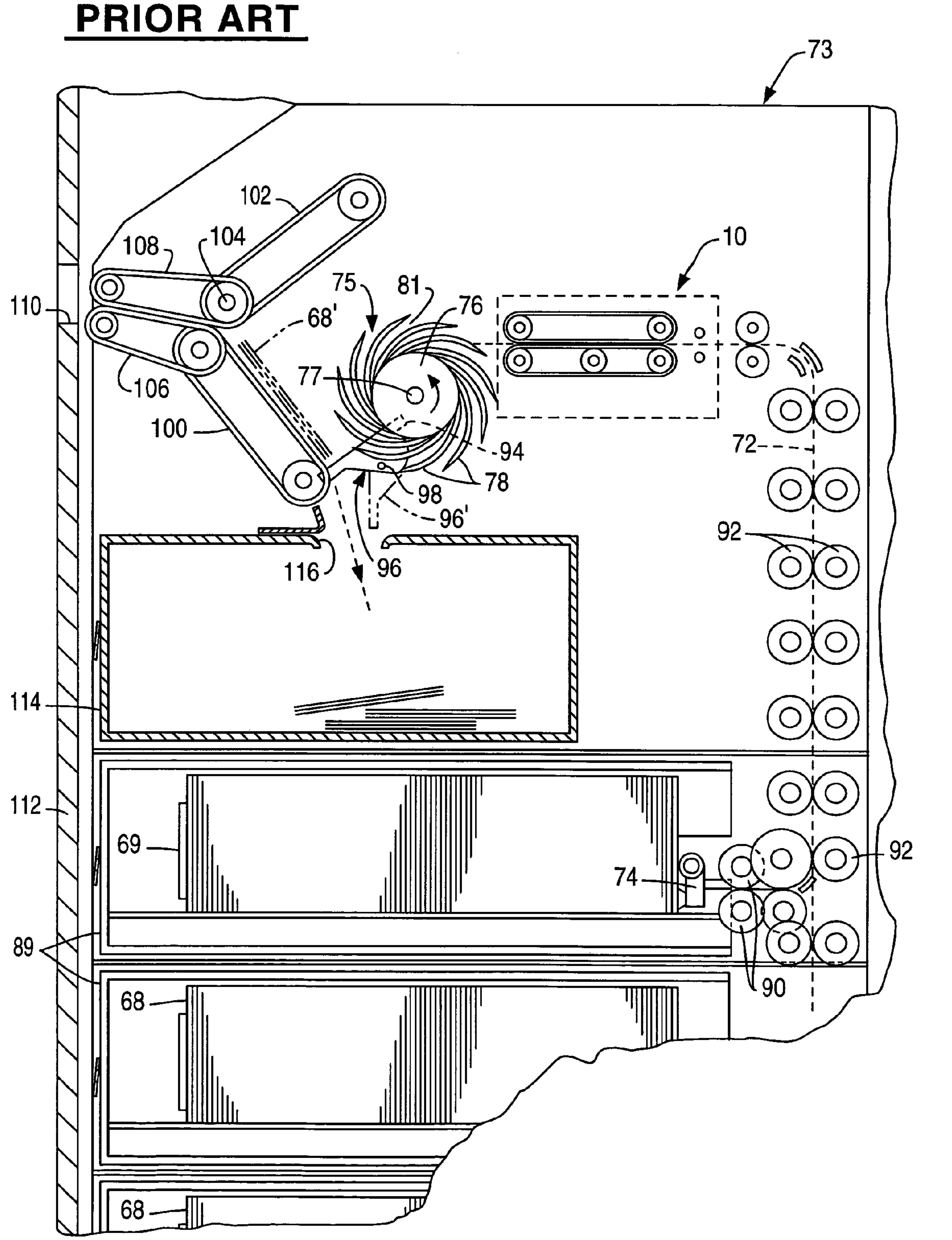
FIG. 1 PRIOR ART
FIG. 1 shows a schematic side elevation view of a cash dispenser unit of an automated teller machine (ATM)
Figure 2:
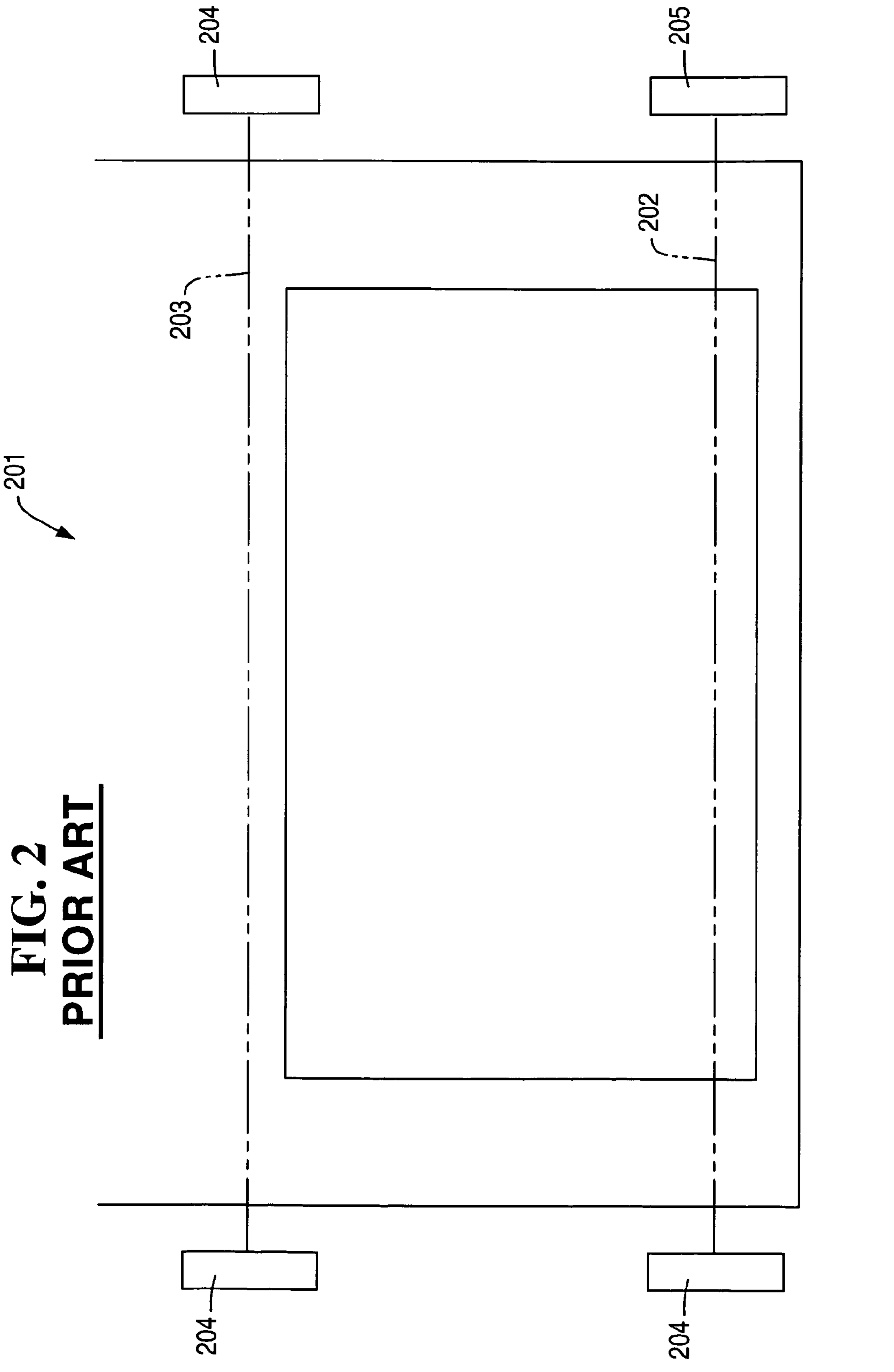
FIG. 2 PRIOR ART
FIG. 2 shows a schematic diagram of a shuttle for use in a dispensing unit of an ATM.
Figure 3:
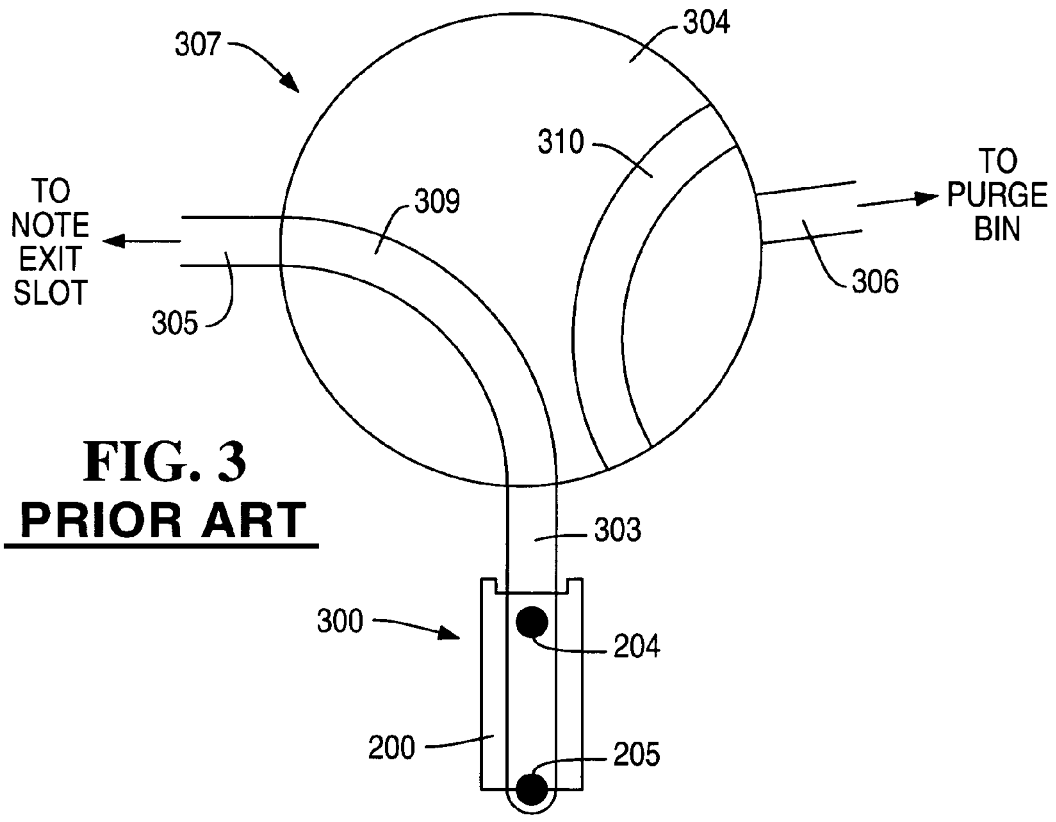
FIG. 3 PRIOR ART
FIGS. 3 and 4 show schematic diagrams of a shuttle mounted on a track.
Figure 4:
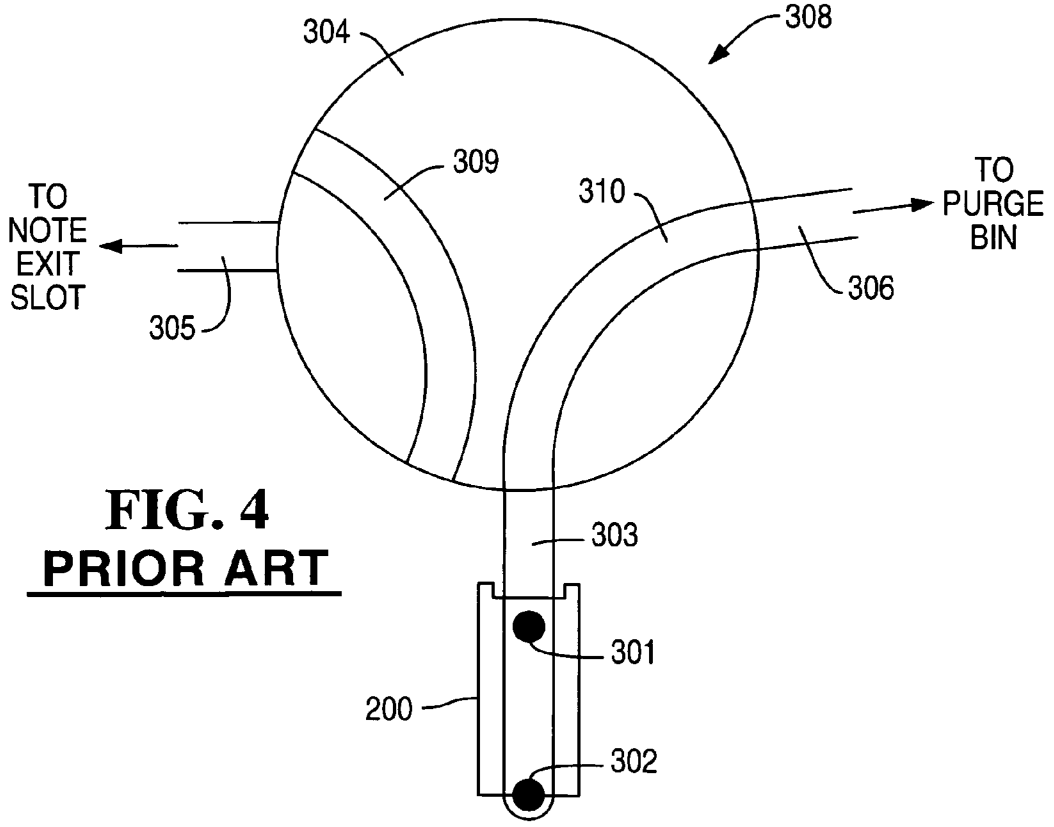
FIG. 4 PRIOR ART

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

Figure 5:
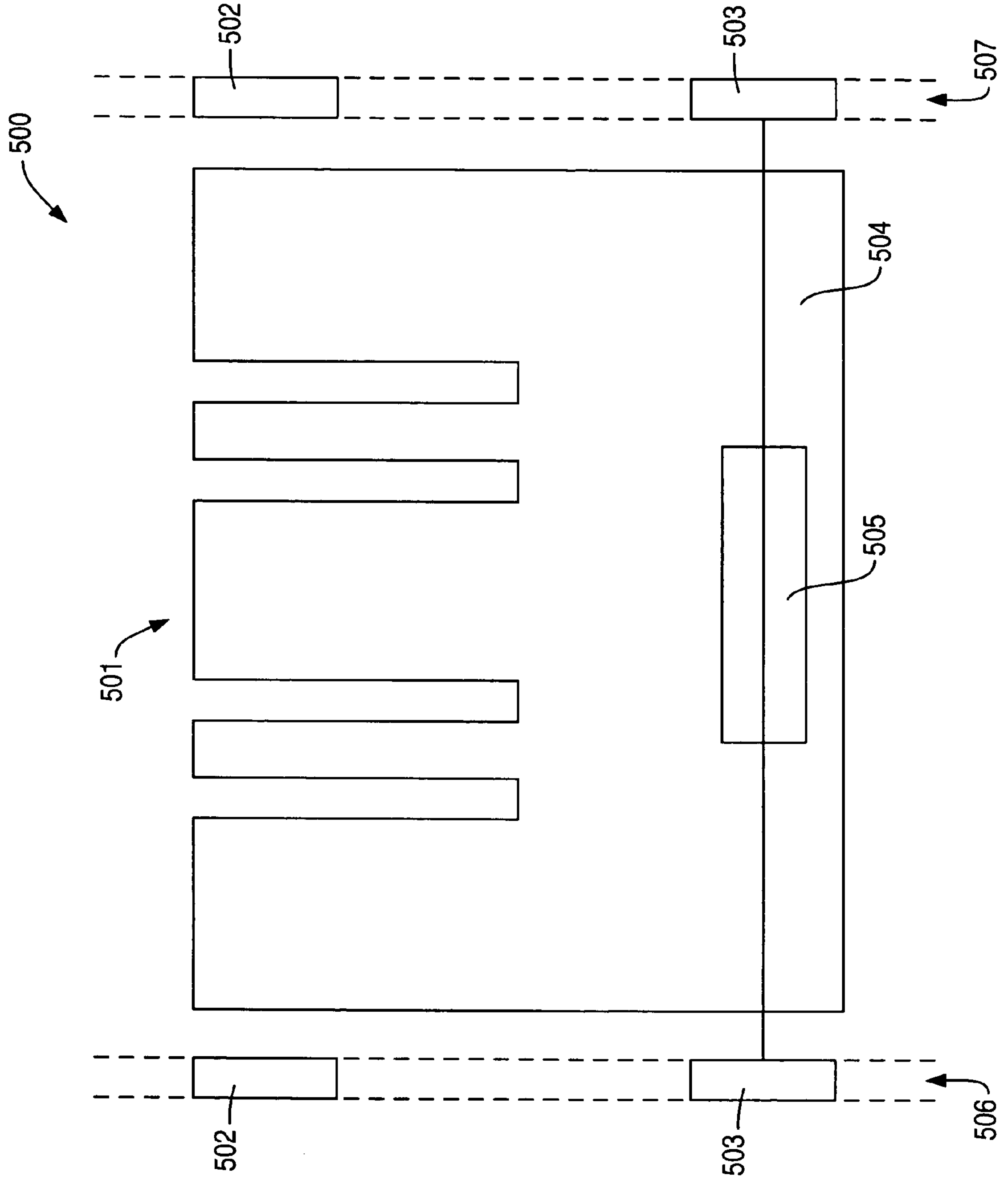
FIG. 5 shows a schematic diagram of a shuttle for use in a self-service terminal (SST)

In a self-service terminal (SST), media to be dispensed in a single operation may be assembled into a bundle in a shuttle. The shuttle 500, as shown in FIG. 5, is substantially cuboid in shape and has an opening 501 on one face for receiving the media. The shuttle is mounted on two pairs of wheels 502, 503 and one pair of the wheels 503 are mounted on an axle 504 which is driven by a motor 505. The driven wheels 503 and the non-driven wheels 502 may be smooth or may have teeth and resemble a cog or gear wheel. The non-driven wheels 502 may be referred to as 'guide wheels' and the driven wheels 503 may be referred to as 'drive wheels'. The shuttle follows a path within the SST that is defined by two parallel shuttle path (or track) arrangements 506, 507 in which the wheels 502, 503 of the shuttle run. The shuttle runs between its home position, in which it can receive media that is to be dispensed, and either a dispensing position or a purge position. In the dispensing position the media can be removed from the shuttle and presented to the user of the SST and in the purge position, the media can be removed from the shuttle and deposited in a purge bin.

Figure 6:
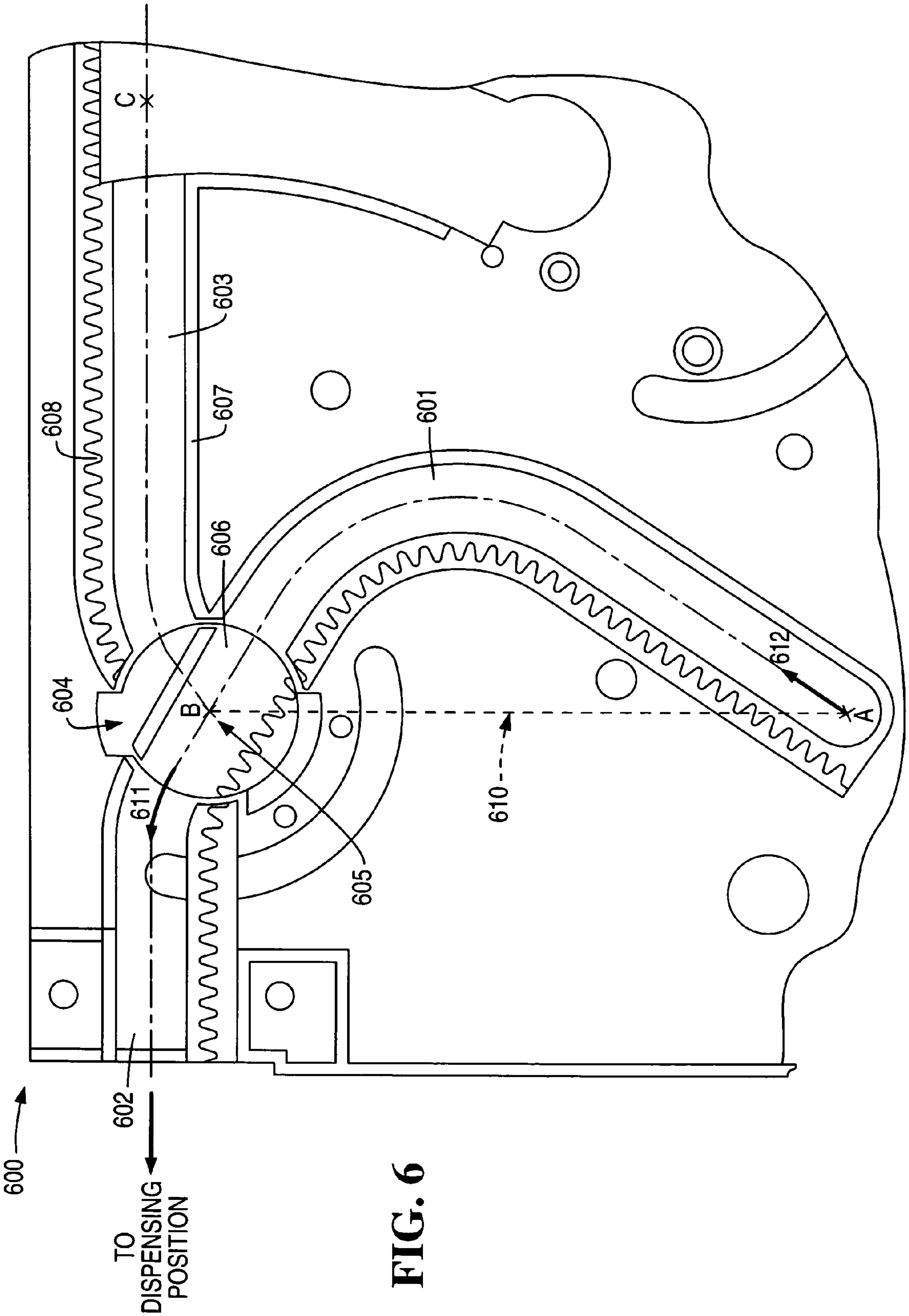
FIGS. 6, 7 and 8 show a schematic diagram of a shuttle path arrangement including a rotating path switch which is shown in each of 3 different positions.

FIG. 6 shows a shuttle path (or track) arrangement 600 that includes three lengths of track 601-603 with a rotating path switch 604 located at the intersection of all three lengths of track 601-603. It will be appreciated that in operation, an SST may comprise a single shuttle path arrangement or two identical (or similar) shuttle path arrangements mounted parallel to each other, such that the shuttle fits between the two shuttle path arrangements with one wheel of each pair running in each shuttle path. The following discussion will only refer to a single shuttle path, a single drive wheel and a single guide wheel by way of example only.

The rotating path switch 604 may be rotated in a controlled manner about its centre (axis 605). Across the centre of the switch is substantially straight portion of track 606 that is of substantially the same width and design as the three lengths of track 601-603. In the example shown in FIG. 6, the track has a first edge 607 that is substantially smooth and a second edge 608 which is ridged in order to co-operate with the teeth on the drive wheel 503. The rotating path switch 604 is shown in FIG. 6 in a first position in which the portion of track 606 on the switch connects the first track length 601 to the second track length 602. In this first position the ridged edge of the portion of track 606 on the switch is aligned with the ridged edges of the first and second track lengths and the smooth edge of the portion of the track on the switch is aligned with the smooth edges of the first and second track lengths. The motion of the switch is described in more detail below with other positions of the switch being shown in FIGS. 7 and 8.

In its home position the shuttle has its drive wheel 503 located at position A (the position marked is the location of the centre of the wheel) at the end of the first length of track 601 which is distal to the rotating path switch 604 (position B is coincident with the axis of rotation 605). In the home position, the guide wheel 502 is located at position B that is central to the rotating path switch 604. In the home position, the shuttle is therefore substantially vertical (for the orientation shown in FIG. 6) lying along a line between positions A and B, (shown as a dotted line 610 in FIG. 6).

The second length of track 602 extends from the rotating path switch 604 to the dispensing position (extending to the left, as shown in FIG. 6), whilst the third length of track 603 extends from the rotating path switch 604 to the purge position (extending to the right, as shown in FIG. 6). Although the second and third lengths of track 602, 603 are substantially straight over a large proportion of their length, both tracks are curve down through an angle of approximately 30° as they approach the rotating path switch 604. As the linear portion of each track is substantially horizontal, each track 602, 603 therefore meets the rotating path switch 604 at an angle of approximately 60° to the vertical, with approximately 120° between the two tracks. The centre of the rotating path switch (axis 605) therefore lies below the centre line of the straight portions of each of the two lengths of tracks 602, 603. This curving down of the track lengths as they approach the rotating path switch is advantageous for reasons that will be described below. In the example shown, the angle between the first and third track lengths, at the point where they join the rotating path switch is approximately 60°. This means that the angle between the first and second track lengths is approximately 180°.

In order to move to the dispensing position from the home position, the shuttle needs to move along the second length of track 602 and the rotating path switch is therefore placed in the first position, as shown in FIG. 6 and described above. The shuttle is driven by its drive wheel 503, initially located at position A, and the guide wheel 502 is pushed along the track from position B. Due to the angle of the track portion 606 (approximately 60° to the vertical), the guide wheel 502 can only move in one direction when a force (having a vertical component) is applied to it via the shuttle from the drive wheel 503. The guide wheel 502 is therefore pushed from position A off the rotating path switch and into the second track length 602 (as shown by arrow 611). The drive wheel follows (as shown by arrow 612), moving along the first track length 601 from position A, to the rotating path switch 604 and then along the second track length 602. The shuttle stops when it reaches the dispensing position (not shown in FIG. 6). To return to the home position (shown by dotted line 610), the motor on the shuttle is operated in the reverse direction and the movement described above is reversed.

Figure 7:
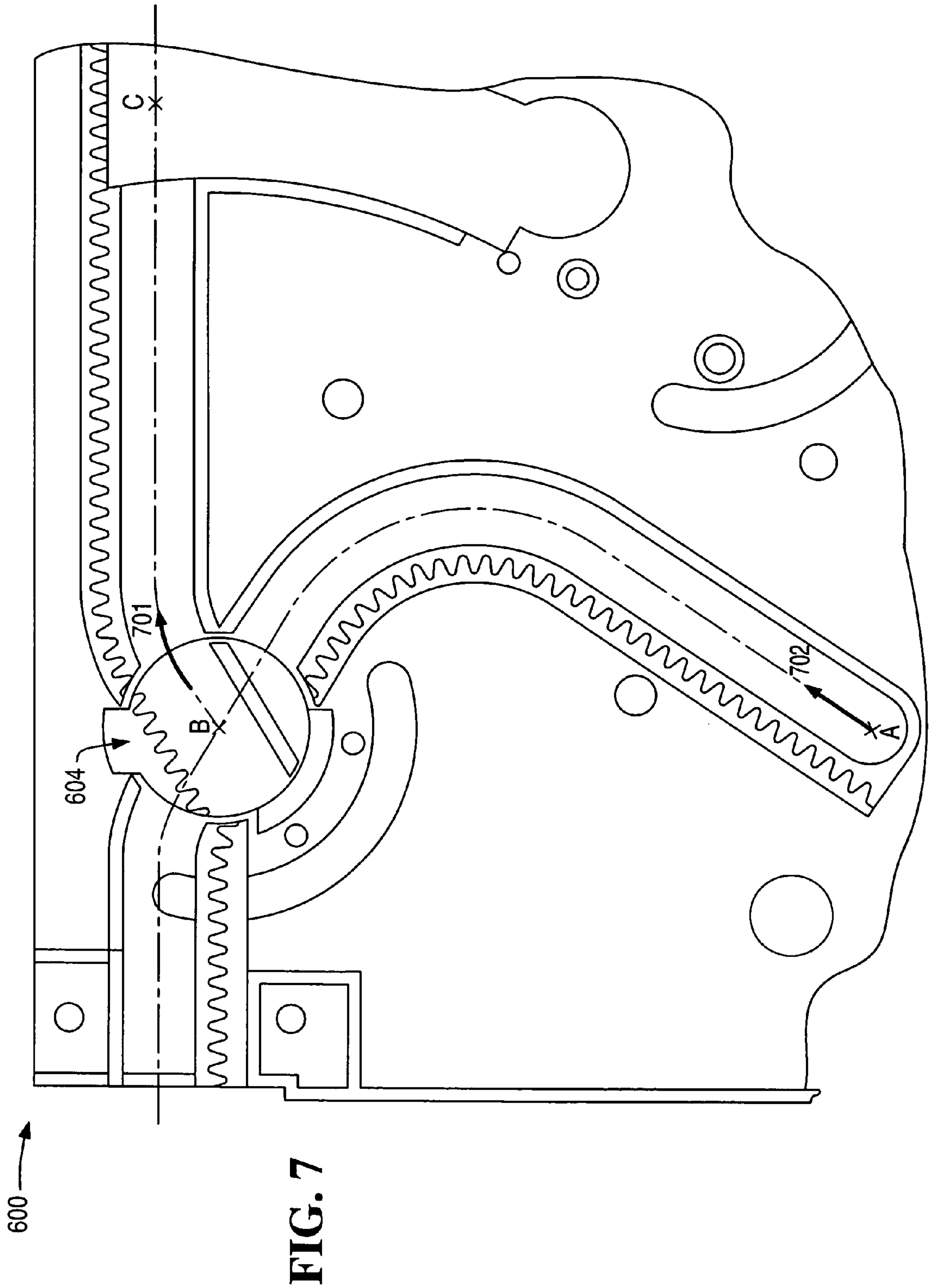
Figure 8:
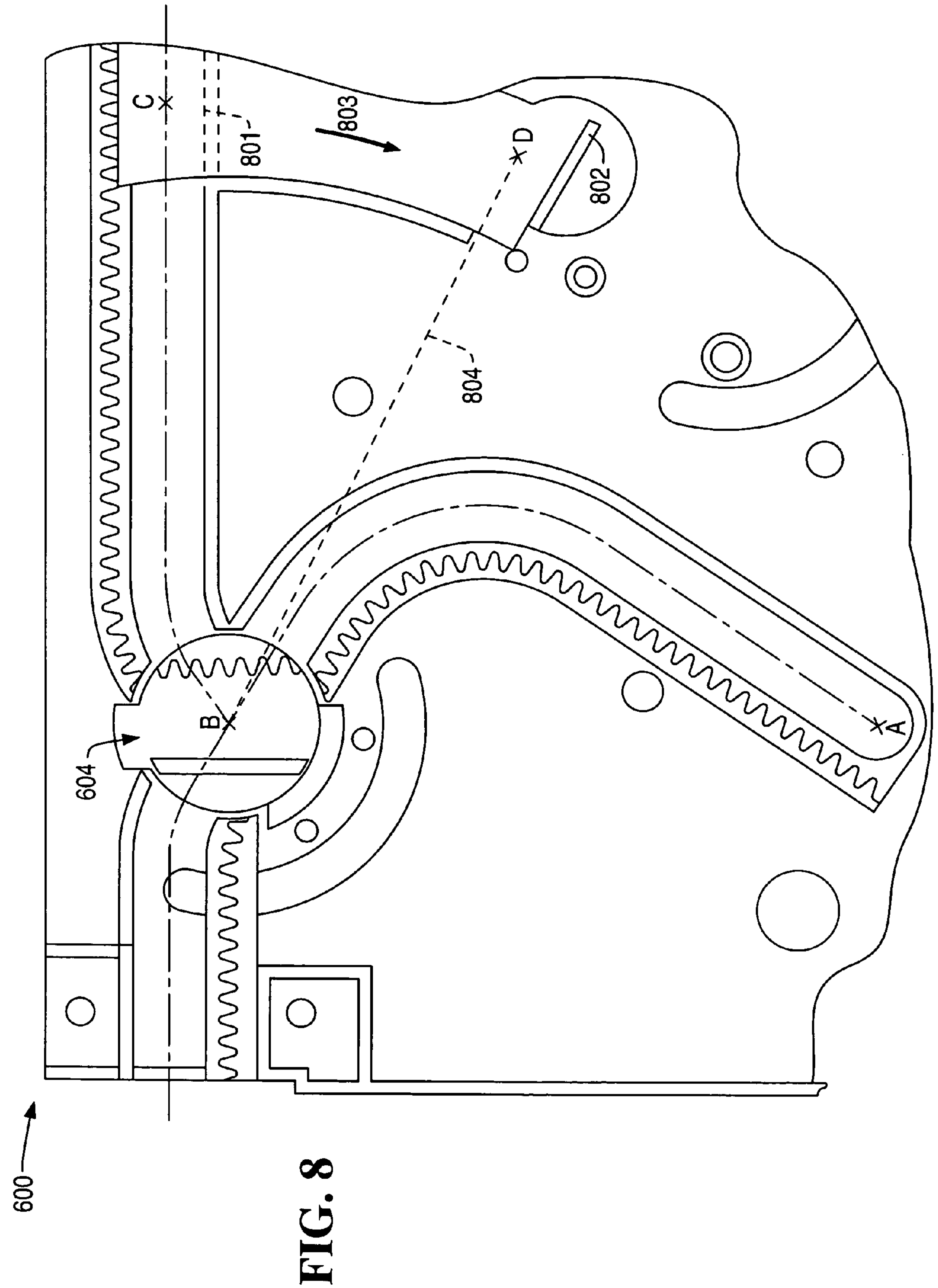

In order to move to the purge position (804 in FIG. 8) from the home position (610 in FIG. 6), the guide wheel 502 of the shuttle needs to move along the third length of track 603 and the rotating path switch therefore needs to be moved from its first position shown in FIG. 6. FIG. 7 shows the same shuttle path arrangement 600 as shown in FIG. 6; however the rotating path switch 604 is shown in a second position. To move between the first position and the second position the rotating path switch is rotated clockwise by approximately 120° about its axis 605 (or anticlockwise by approximately 240°). In the second position the ridged edge of the portion of track 606 on the switch is aligned with the ridged edge of the third track length 603 (the upper edge of the third track length) and the smooth edge of the portion of the track on the switch is aligned with the smooth edge of the third track length (the lower edge). The shuttle is again driven by its drive wheel 503, initially located at position A. Due to the angle of the track portion 606 (approximately 60° to the vertical), the guide wheel 502 can only move in one direction when a force (having a vertical component) is applied to it via the shuttle from the drive wheel 503. The guide wheel 502 is therefore pushed from position A off the rotating path switch and into the third track length 603 (as shown by arrow 701). The drive wheel follows (as shown by arrow 702), moving along the first track length 601 from position A towards the rotating path switch 604. With the rotating path switch 604 in the second position (as shown in FIG. 7) it is not possible for the drive wheel 503 to move from the first track length 601 into the track portion 606 on the rotating path switch because the track portion is not aligned with the first track length. Therefore, once the guide wheel has moved into the third track length, the rotating path switch is moved back to the first position (as shown in FIG. 6) so that the drive wheel 503 can move to position B. When the drive wheel reaches position B, the guide wheel will be at position C on the third track length 603. At this point, the rotating path switch 604 is rotated clockwise, through the second position to a third position, shown in FIG. 8. As the rotating path switch 604 is rotated beyond the second position to the third position, a portion of the smooth lower track wall of the third length of track, adjacent to position C, moves in an arc from a position 801 (shown by dotted lines in FIG. 8) to a position 802. As the guide wheel at position C is resting on this portion of the lower track wall, the guide wheel follows the same arc (as indicated by arrow 803) to arrive at position D. The shuttle has now arrived in the purge position such that notes can be removed from the shuffle and driven into a purge bin. In the purge position the guide wheel is located at position D and the drive wheel at position B, with the position of the shuttle lying along a line between positions B and D, (shown as a dotted line 804 in FIG. 8). To return to the home position (shown by dotted line 610 in FIG. 6) from the purge position (shown by dotted line 804 in FIG. 8), the motor on the shuttle is operated in the reverse direction and the movement of the shuttle, switch and portion of track wall described above is reversed.

It will be appreciated that the particular geometry described above and shown in FIGS. 6 to 9 is shown by way of example only. In the examples shown in FIGS. 6 to 8, the angle between the home position of the shuttle and the second and third length of track 602, 603 is approximately equal to 120° as can be seen clearly in FIG. 6. Whilst this angle need not be equal to 120° the angle should exceed 90°.

In the above description the rotating path switch 604 is described as rotating in a clockwise direction. It will be appreciated by a skilled person that these motions described are way of example only and the switch could alternatively be moved in the opposite direction.

In the example described above, the rotating path switch 604 is approximately 28 mm in diameter.

Although the above description relates to an ATM, this is by way of example only. The invention is applicable to any self-service terminal including, but not limited to, banking machines, ticket machines, public telephones and vending machines and voting machines.

The media handled by the shuttle (or media carrier) may include plastic cards (e.g. credit, debit cards), currency, receipts, statements, tickets, ballot papers, other printed matter, phone top-up cards etc.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

What is claimed is:

1. A track arrangement for guiding a media carrier in a self-service terminal between a home position and one of a second and a third position, the track arrangement comprising:

a first track length defining the home position of the media carrier;

a second track length associated with the second position;

a third track length associated with the third position; and a switch arranged to be rotatable around a central axis adjacent the convergence of the three track lengths, the switch having a portion of track extending across the switch;

wherein a first angle between the second track length at an end adjacent to the switch, and the home position of the media carrier, is greater than 90°; and wherein a second angle between the third track length at an end adjacent to the switch and the home position of the media carrier is greater than 90°.

2. A track arrangement according to claim 1, wherein the switch is rotatable between a first and a second position, wherein in the first position, the portion of track is aligned with the first and second lengths of track, and in the second position, the portion of track is aligned with the third length of track.

3. A track arrangement according to claim 1, wherein the first angle is approximately 120° and the second angle is approximately 120°.

4. A track arrangement according to claim 1, wherein the home position of the media carrier is defined as extending between an end of the first track length distal from the switch and the central axis of the switch.

5. A track arrangement according to claim 1, wherein the second position is a media dispensing position.

6. A track arrangement according to claim 1, wherein the third position is a media purging position.

7. A track arrangement according to claim 1, wherein the home position is a media receiving position.

8. A dispenser for media comprising: a track arrangement according to claim 1; and a media carrier.

9. A dispenser for media according to claim 8, wherein the media carrier comprises a body, a guide wheel, a drive wheel and a motor connected to the drive wheel, and wherein the guide wheel and the drive wheel move along the track arrangement.

10. A dispenser for media according to claim 9, wherein in the home position of the media carrier, the drive wheel is located in the first track length and the guide wheel is located at the central axis of the switch.

11. A dispenser for media according to claim 9, wherein in the second position of the media carrier, the drive wheel and the guide wheel are located in the second track length.

12. A dispenser for media according to claim 9, wherein in the third position of the media carrier, the drive wheel is located at the central axis of the switch.

13. A dispenser for media according to claim 12, wherein the third track length comprises a movable portion, and wherein in the third position of the media carrier, the guide wheel is located on the movable portion and the movable portion has moved from a first position in line with the third track length and a second position below the third track length.

14. A method of moving media from a home position to a purge position within a self-service terminal, the self service terminal comprising:

a media carrier including a drive wheel and a guide wheel; and a track arrangement comprising:

a first track length defining the home position of the media carrier;

a second track length associated with a dispensing position;

a third track length associated with the purge position; and a switch arranged to be rotatable around a central axis adjacent the convergence of the three track lengths, the switch having a portion of track extending across the switch;

wherein a first angle between the second track length at an end adjacent to the switch, and the home position of the media carrier, is greater than 90°; and wherein a second angle between the third track length at an end adjacent to the switch and the home position of the media carrier is greater than 90°, and wherein the drive and guide wheels are guided by the track arrangement, the method comprising:

receiving media in the media carrier at the home location, wherein in the home location the drive wheel is located in the first track length and the guide wheel is located at the central axis of the switch;

moving the switch into a first position in which the portion of the track is aligned with the third length of track;

moving the media carrier such that the guide wheel enters the third length of track;

moving the switch to a second position in which the portion of track is aligned with the first length of track; and moving the media carrier along the third length of track until the drive wheel is located at the central axis of the switch.

15. A method according to claim 14, wherein the third track length comprises a moveable portion and wherein the method further comprises:

moving the moveable portion through an arc; and moving the guide wheel with the moveable portion such that the guide wheel remains resting on the moveable portion.

* * * * *